(12) United States Patent
Segawa

(10) Patent No.: US 7,463,184 B2
(45) Date of Patent: Dec. 9, 2008

(54) OBJECT DETECTION APPARATUS, OBJECT DETECTION METHOD, OBJECT DETECTION PROGRAM, AND DISTANCE SENSOR

(75) Inventor: Eigo Segawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 11/117,678

(22) Filed: Apr. 29, 2005

(65) Prior Publication Data

US 2005/0206553 A1 Sep. 22, 2005

Related U.S. Application Data

(63) Continuation of application No. PCT/JP03/05927, filed on May 13, 2003.

(51) Int. Cl.
G01S 13/00 (2006.01)
B60R 22/00 (2006.01)
G06F 17/10 (2006.01)

(52) U.S. Cl. .............................. 342/52; 701/45; 701/301
(58) Field of Classification Search ................. 250/221; 342/52; 375/240; 705/4
See application file for complete search history.

(56) References Cited

U.S. PATENT DOCUMENTS

| | | | | |
|---|---|---|---|---|
| 5,983,147 | A * | 11/1999 | Krumm | 701/45 |
| 6,885,968 | B2 * | 4/2005 | Breed et al. | 702/143 |
| 2002/0133285 | A1 * | 9/2002 | Hirasago | 701/96 |
| 2003/0209893 | A1 * | 11/2003 | Breed et al. | 280/735 |
| 2004/0133927 | A1 * | 7/2004 | Sternberg et al. | 725/136 |
| 2005/0004762 | A1 * | 1/2005 | Takahama et al. | 701/301 |
| 2005/0131607 | A1 * | 6/2005 | Breed | 701/45 |

(Continued)

FOREIGN PATENT DOCUMENTS

JP 7-110381 4/1995

(Continued)

OTHER PUBLICATIONS

Japanese Office Action dated Nov. 27, 2007, Application No. 2004-571832.

*Primary Examiner*—Thomas H. Tarcza
*Assistant Examiner*—Harry Liu
(74) *Attorney, Agent, or Firm*—Westerman, Hattori, Daniels & Adrian, LLP.

(57) ABSTRACT

The present invention provides an object detection apparatus for detecting at least one object existing in an observation subject space. The object detection apparatus comprises an object model recording unit 3 that calculates and records an object model, which is an image expressing the form of a detection subject, a millimeter wave distance sensor 1 that calculates the distance to an object candidate by emitting millimeter waves so as to cover the entirety of the observation subject space at one time, a stereo image sensor 2 that calculates a characteristic image and a distance image having different viewpoints, a control unit 7 that selects an object candidate, a model conversion unit 4 that calculates a comparison model from the object model, a comparison image extraction unit 5 that extracts a comparison image from the characteristic image and distance image, and a similarity comparison unit 6 that calculates the similarity between the comparison model and comparison image, and when a maximum similarity is within a predetermined range, calculates the three-dimensional position of the object from the coordinates of the comparison image and the distance to the object candidate, and outputs the three-dimensional position of the object to the outside.

12 Claims, 9 Drawing Sheets

U.S. PATENT DOCUMENTS

| | | | |
|---|---|---|---|
| 2006/0167595 A1* | 7/2006 | Breed et al. | 701/1 |
| 2006/0208169 A1* | 9/2006 | Breed et al. | 250/221 |

FOREIGN PATENT DOCUMENTS

| | | |
|---|---|---|
| JP | 8-48199 | 2/1996 |
| JP | 08-083400 | 3/1996 |
| JP | 9-138277 | 5/1997 |
| JP | 9-178853 | 7/1997 |
| JP | 2001-116512 | 4/2001 |
| JP | 2001-330665 | 11/2001 |
| JP | 2002-207077 | 7/2002 |
| JP | 2002-274301 | 9/2002 |

* cited by examiner

FIG. 5
| OBJECT CANDIDATE NUMBER i | DISTANCE $d_i$ | RELATIVE VELOCITY $v_i$ |
|---|---|---|
| 1 | $d_1$ | $v_1$ |
| 2 | $d_2$ | $v_2$ |
| ⋮ | ⋮ | ⋮ |
| n | $d_n$ | $v_n$ |
FIG. 6
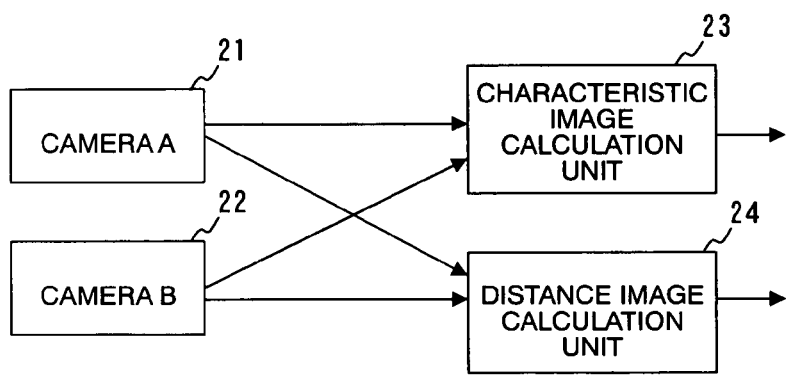
FIG. 7A
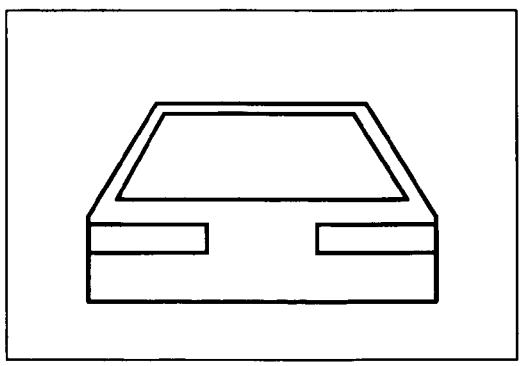
FIG. 7B
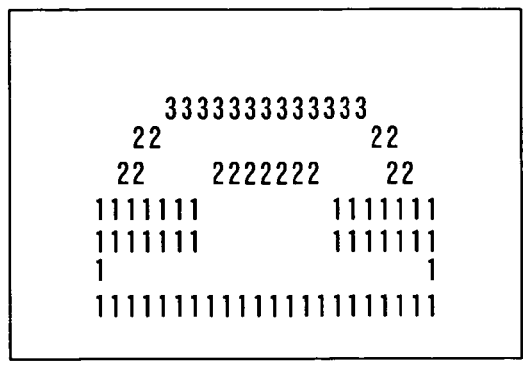

FIG. 11

$$C1 = -\sum_{p=p0}^{p0+lx}\sum_{q=q0}^{q0+ly} |di - D(p,q)|$$

$$C2 = \sum_{p=p0}^{p0+lx}\sum_{q=q0}^{q0+ly} F(Mj'(p-p0, q-q0), E1(p,q))$$

$$C3 = \sum_{p=p0}^{p0+lx}\sum_{q=q0}^{q0+ly} F(Mj'(p-p0, q-q0), E2(p+dx, q+dy))$$

$$F(a,b) = \begin{cases} 1 & (a=b) \\ 0 & (a \neq b) \end{cases}$$

$$C = w1 \cdot C1 + w2 \cdot C2 + w3 \cdot C3$$

FIG. 12

$$Xi = \frac{di \cdot kx \cdot p\max}{\sqrt{kx^2 p\max^2 + ky^2 q\max^2 + f^2}}$$

$$Yi = \frac{di \cdot ky \cdot q\max}{\sqrt{kx^2 p\max^2 + ky^2 q\max^2 + f^2}}$$

$$Zi = \frac{di \cdot f}{\sqrt{kx^2 p\max^2 + ky^2 q\max^2 + f^2}}$$

$$Xi(t+1) = Xi(t) + \frac{Xi(t) \cdot vi(t)}{\sqrt{Xi(t)^2 + Yi(t)^2 + Zi(t)^2}}$$

$$Yi(t+1) = Yi(t) + \frac{Yi(t) \cdot vi(t)}{\sqrt{Xi(t)^2 + Yi(t)^2 + Zi(t)^2}}$$

$$Zi(t+1) = Zi(t) + \frac{Zi(t) \cdot vi(t)}{\sqrt{Xi(t)^2 + Yi(t)^2 + Zi(t)^2}}$$

OBJECT DETECTION APPARATUS, OBJECT DETECTION METHOD, OBJECT DETECTION PROGRAM, AND DISTANCE SENSOR

This application is a continuation of international application PCT/JP2003/05927, filed on May 13, 2003.

TECHNICAL FIELD

The present invention relates to an object detection apparatus, an object detection method, and an object detection program for detecting the three-dimensional position of an object existing within an observation subject space, and a distance sensor used in the object detection apparatus.

BACKGROUND ART

Three main types of object detection apparatuses, i.e. a stereo image sensor, a laser radar, and a millimeter wave radar, are currently in practical use for detecting an object at a remove of several meters or more.

The advantages of a stereo image sensor are that the observation subject space is large, the bearing of the object is accurate, object identification is easy, and so on. The disadvantages are that the precision of the distance to the object is low, the sensor is affected easily by its peripheral environment, such as rain or fog, and so on.

The advantages of a laser radar are that it is small, the precision of the distance to the object is high, and so on. The disadvantages are that the observation subject space is small, the radar is affected easily by its peripheral environment, such as rain or fog, and so on.

The advantages of a millimeter wave radar is that the precision of the distance to the object is high, the radar is not affected easily by its peripheral environment, such as rain or fog, and so on. The disadvantages are that the observation subject space is small, object identification is difficult, and so on.

The performance requirements of an object detection apparatus include a large observation subject space, accurate detection of only the object to be detected, accurate detection of the three-dimensional position of the object, and so on, and the apparatus is also required to have a small size. However, it is difficult to achieve these performance requirements with a stand-alone image sensor, laser radar, or millimeter wave radar due to the respective disadvantages thereof described above.

To compensate for these disadvantages, an object detection apparatus combining a stereo image sensor and a laser radar (see Japanese Unexamined Patent Application Publication H6-59033 (pages 3 to 7, FIG. 1), for example) and an object detection apparatus combining a stereo image sensor and a millimeter wave radar (see Japanese Unexamined Patent Application Publication 2001-296357 (pages 3 to 5, FIG. 6), for example) have been proposed.

However, a combination of a stereo image sensor and a laser radar is also affected easily by the peripheral environment, and it is therefore difficult to obtain a stable performance.

Moreover, if a conventional millimeter wave radar is used in a combination of a stereo image sensor and a millimeter wave radar, the size of the antenna cannot be reduced, and it is therefore difficult to reduce the size of the apparatus. A conventional millimeter wave radar detects the bearing of an object, the distance to the object, and the relative velocity of the object by reducing the beam width of the emitted millimeter waves by an angle of approximately two to four degrees, and varying the direction in which the beam is emitted mechanically or electronically. The beam width must be reduced to increase the bearing resolution, and hence the antenna size and beam width are in inverse proportion, making it impossible to reduce the size of the antenna in order to improve the bearing resolution.

DISCLOSURE OF THE INVENTION

The present invention has been designed in order to solve these problems, and it is an object thereof to provide an object detection apparatus which is capable of realizing the performance requirements of a large observation subject space, accurate detection of only the object to be detected, and accurate detection of the three-dimensional position of the object, and which can also be reduced in size, as well as an object detection method, an object detection program, and a distance sensor used in the object detection apparatus.

The present invention is an object detection apparatus for detecting a detection subject existing in a predetermined space, characterized in comprising: an object model recording unit that records as an object model a model form of at least one detection subject to be detected; a distance sensor that detects at least one object candidate and calculates the distance to the object candidate by emitting electromagnetic waves in a radial form so as to cover the entirety of the predetermined space and detecting reflected waves of the electromagnetic waves; a stereo image sensor that captures two images of the object candidate from different viewpoints and obtains predetermined image information from the two captured images; and a determination unit that determines whether or not the object candidate is the detection subject on the basis of the object model and the image information.

According to such a constitution, the advantages of a distance sensor using electromagnetic waves, such as highly accurate detection of the distance to an object and a low likelihood of being affected by the peripheral environment, such as rain or fog, and the advantages of a stereo image sensor, such as a wide observation subject space, accurate detection of the object bearing, and easy object identification, can be achieved simultaneously. Moreover, the apparatus can be reduced in size, enabling easy installation in a vehicle or the like.

Note that the distance sensor of this embodiment is constituted by a millimeter wave distance sensor, and the determination unit is constituted by a similarity comparison unit. Further, in this embodiment the predetermined space corresponds to an observation subject space, but the observation subject space may be formed by a plurality of predetermined spaces.

The object detection apparatus of the present invention is further characterized in comprising a model conversion unit that calculates a comparison model, which is an image in which the size of the object model is converted to a size corresponding to the calculated distance to the object candidate, and in that the determination unit determines whether or not the object candidate is the detection subject on the basis of the comparison model converted by the model conversion unit, and the image information.

According to such a constitution, the object candidate and object model can be compared easily, and the determination as to whether or not the object candidate is the detection subject can be made easily.

Further, the object detection apparatus of the present invention is characterized in that the predetermined image information obtained by the stereo image sensor is information of a distance image relating to the distance of the object candidate. According to this constitution, the determination as to whether or not the object candidate is the detection subject can be made using this distance information.

Further, the object detection apparatus of the present invention is characterized in that the predetermined image information obtained by the stereo image sensor is information of a characteristic image relating to the form of the object candidate. According to this constitution, the determination as to whether or not the object candidate is the detection subject can be made using information regarding the characteristic form of the detection subject.

The object detection apparatus of the present invention is also characterized in that the predetermined image information obtained by the stereo image sensor is information of a distance image relating to the distance of the object candidate and information of a characteristic image relating to the form of the object candidate. According to this constitution, the determination as to whether or not the object candidate is the detection subject can be made using both the distance information and the characteristic form information of the object candidate, enabling an improvement in the reliability of the determination.

The object detection apparatus of the present invention is also characterized in that the object model recorded in the object model recording unit takes a form obtained by capturing an image of the detection subject at a predetermined distance.

According to this constitution, the object model can be formed easily from the detection subject.

The object detection apparatus of the present invention is also characterized in comprising a comparison image extraction unit that extracts from the images comprising the predetermined image information an image in the size range of the comparison model as a comparison image, and in that the determination unit determines whether or not the object candidate is the detection subject on the basis of the comparison image extracted by the comparison image extraction unit and the comparison model.

According to this constitution, the comparison data amount can be handled in a uniform manner, and the comparison precision during pattern matching, for example, can be improved.

The object detection apparatus of the present invention is also characterized in that the determination unit determines whether or not the object candidate is the detection subject on the basis of the similarity between the comparison model of each of a plurality of recorded object models, and the image information.

According to this constitution, a detection subject to be detected which has a plurality of forms and so on can be detected.

The object detection apparatus of the present invention is also characterized in that when a plurality of object candidates is detected by the distance sensor, the model conversion unit calculates comparison models for all of the plurality of object models corresponding to the object candidates, whereby the determination unit calculates the similarity on the basis of the comparison model and the image information of each object candidate, and determines the comparison model having the maximum similarity of all the object candidates [to be the detection subject].

According to this constitution, the detection subject can be determined even when a plurality of object candidates is detected.

The object detection apparatus of the present invention is also characterized in that the determination unit compares the maximum similarity to a predetermined threshold in order to determine whether or not the object candidate is the detection subject corresponding to the comparison model. According to this constitution, the reliability of object detection can be improved.

The object detection apparatus of the present invention is also characterized in comprising a position calculation unit which, when the object candidate is determined to be the detection subject by the determination unit, calculates the three-dimensional position of the object candidate on the basis of the image information and the distance to the object candidate, assuming that the object candidate is the detection subject.

According to this constitution, the position of the detected object can be learned.

The object detection apparatus of the present invention is also characterized in that the predetermined image information comprises characteristic images obtained by performing edge detection on the captured images using a predetermined threshold.

According to this constitution, the form characteristics of the object can be expressed easily with a small amount of data.

The object detection apparatus of the present invention is also characterized in that the comparison image extraction unit forms the comparison image from only the periphery of the pixels, from among the pixels of the distance image, whose differential distance to the object candidate is within a predetermined range.

According to this constitution, the captured images to be compared with the object model can be extracted efficiently.

The object detection apparatus of the present invention is also characterized in comprising a comparison image extraction unit that extracts from the images comprising the predetermined image information an image in the size range of the comparison model as a comparison image. When the comparison image is extracted from the distance image and at least one of the characteristic images, the determination unit calculates a distance image similarity, which is a value obtained by totaling the difference between the value of each pixel of the comparison image extracted from the distance image and the distance of the object candidate for all pixels, then calculates a characteristic image similarity, which is a value obtained by totaling the degree to which the values of each pixel of the comparison image extracted from the characteristic image match the values of the corresponding pixels of the comparison model for all pixels, and then calculates the similarity by adding together the distance image similarity, following predetermined weighting thereof, and at least one of the characteristic image similarities, following predetermined weighting thereof.

The object detection apparatus of the present invention is also characterized in comprising a comparison image extraction unit that extracts from the images comprising the predetermined image information an image in the size range of the comparison model as a comparison image, and in that the determination unit calculates the similarity on the basis of a value obtained by totaling the degree to which the values of each pixel of the comparison image match the values of the corresponding pixels of the comparison model for all pixels.

The object detection apparatus of the present invention is also characterized in that when the comparison image is extracted from the distance image serving as the predetermined image information, the determination unit calculates the similarity on the basis of a value obtained by totaling the difference between the value of each pixel of the comparison image and the distance of the object candidate for all pixels.

According to these constitutions, the comparison model and comparison image can be compared easily and accurately.

The object detection apparatus of the present invention is also characterized in that the distance sensor calculates the distance to the object candidate from reflected waves exceeding a predetermined threshold in intensity.

The object detection apparatus of the present invention is also characterized in that the aforementioned electromagnetic waves are millimeter waves.

According to these constitutions, by using millimeter waves, the distance to the object can be measured with precision, and the millimeter waves are not likely to be affected by the peripheral environment, such as rain and fog.

Further, the object detection apparatus of the present invention is characterized in that the distance sensor also calculates the relative velocity of the object candidate from reflected waves exceeding a predetermined threshold in intensity, and the determination unit outputs the relative velocity of the object candidate acknowledged to be the object outside together with the three-dimensional position of the object.

According to this constitution, the relative velocity of the object can be learned as well as the three-dimensional position.

The object detection apparatus of the present invention is also characterized in that the predetermined space from which the reflected waves are detected is included in the space that is subjected to image capture.

The object detection apparatus of the present invention is characterized in further comprising a storage unit for storing at least one set of the three-dimensional position and relative velocity of the object, and a position prediction unit that predicts the three-dimensional position of the object during the next detection using past three-dimensional positions and relative velocities of the object.

The object detection apparatus of the present invention is also characterized in that the distance sensor predicts the detection range of the reflected waves on the basis of the three-dimensional position obtained through this prediction, and lowers the threshold in the detection range of the reflected waves.

According to this constitution, reflected waves can be detected more easily in the predicted detection range, and hence the distance and velocity can be detected with stability.

The object detection apparatus of the present invention is also characterized in that the stereo image sensor predicts the detection range of the image information on the basis of the three-dimensional position obtained through this prediction, and lowers the threshold in this detection range.

According to this constitution, the edges can be detected more easily in the predicted detection range, and hence edge detection can be performed with stability.

The present invention is also an object detection apparatus for detecting at least one detection subject existing in a predetermined space, characterized in comprising: an object model recording unit that calculates and records an object model, which is an image expressing the form of the at least one detection subject, from a model captured image, which is an image of the detection subject captured in advance at a predetermined distance; a distance sensor that detects at least one object candidate and calculates the distance to the object candidate by emitting electromagnetic waves so as to cover the entirety of the predetermined space and detecting the reflected waves of the electromagnetic waves; a stereo image sensor that captures two images of the object candidate from different viewpoints and obtains predetermined image information from the two captured images; a model conversion unit that calculates a comparison model, which is an image in which the object model is converted to a size corresponding to the distance of the object candidate; a comparison image extraction unit that extracts from the images comprising the predetermined image information an image in the size range of the comparison model as a comparison image; and a similarity comparison unit that calculates the similarity between the comparison model and comparison image for all of the comparison models calculated from the object candidate and all of the comparison images extracted from the comparison model, determines the maximum similarity, which is a maximum degree of the similarity, the comparison model at the time of maximum similarity calculation, and the coordinates of the comparison image at the time of maximum similarity calculation, and when the maximum similarity is within a predetermined range, acknowledges the selected object candidate as the object, calculates the three-dimensional position of the object from the coordinates of the comparison image at the time of maximum similarity calculation and the distance to the object candidate, and outputs the three-dimensional position of the object candidate to the outside.

The present invention is also an object detection method for detecting a detection subject existing in a predetermined space, characterized in comprising: recording a model form of at least one detection subject to be detected as an object model; detecting at least one object candidate and calculating the distance to the object candidate by emitting electromagnetic waves in a radial form so as to cover the entirety of the predetermined space and detecting the reflected waves of the electromagnetic waves; capturing two images of the object candidate from different viewpoints and obtaining predetermined image information from the two captured images; and determining whether or not the object candidate is the detection subject on the basis of the object model and the image information.

The object detection method of the present invention is characterized in further comprising calculating a comparison model, which is an image in which the size of the object model is converted to a size corresponding to the calculated distance to the object candidate, and in that the determination of the determination step as to whether or not the object candidate is the detection subject is made on the basis of the comparison model converted by the model conversion unit, and the image information.

The object detection method of the present invention is also characterized in comprising extracting as a comparison image an image in the size range of the comparison model from the images comprising the predetermined image information, and in that the determination of the determination step as to whether or not the object candidate is the detection subject is made on the basis of the comparison image extracted in the comparison image extraction step and the comparison model.

The object detection method of the present invention is also characterized in that when a plurality of object candidates is detected in the distance calculation step, comparison models for all of the plurality of object models corresponding to the object candidates are calculated in the model conversion step, whereby, in the determination step, the similarity is calculated on the basis of the comparison model and the image information for each object candidate, and the comparison model having the maximum similarity of all the object candidates is determined to be the detection subject.

The object detection method of the present invention is also characterized in that the maximum similarity is compared to a predetermined threshold in the determination step in order to determine whether or not the object candidate is the detection subject corresponding to the comparison model.

The object detection method of the present invention is also characterized in comprising, when the object candidate is determined to be the detection subject in the determination step, calculating the three-dimensional position of the object candidate on the basis of the image information and the distance to the object candidate, assuming that the object candidate is the detection subject.

The object detection method of the present invention is also characterized in comprising extracting as a comparison image an image in the size range of the comparison model from the images comprising the predetermined image information. When the comparison image is extracted from the distance image and at least one of the characteristic images showing the characteristic form, these images constituting the predetermined image information, the determination step comprises calculating a distance image similarity, which is a value obtained by totaling the difference between the value of each pixel of the comparison image extracted from the distance image and the distance of the object candidate for all pixels, calculating a characteristic image similarity, which is a value obtained by totaling the degree to which the values of each pixel of the comparison image extracted from the characteristic image match the values of the corresponding pixels of the comparison model for all pixels, and calculating the similarity by adding together the distance image similarity following predetermined weighting thereof, and at least one of the characteristic image similarities following predetermined weighting thereof.

The object detection method of the present invention is also characterized in comprising further calculating, in the distance calculation step, the relative velocity of the object candidate from the reflected waves exceeding a predetermined threshold in intensity, and in that the determination step comprises outputting the relative velocity of the object candidate outside together with the three-dimensional position of the object.

The object detection method of the present invention is characterized in further comprising storing at least one set of the three-dimensional position and relative velocity of the object, and predicting the three-dimensional position of the object during the next detection using past three-dimensional positions and relative velocities of the object.

The present invention is also an object detection method for detecting at least one detection subject existing in a predetermined space, characterized in comprising: calculating and recording an object model, which is an image expressing the form of the at least one detection subject, from a model captured image, which is an image of the detection subject captured in advance at a predetermined distance; detecting at least one object candidate and calculating the distance to the object candidate by emitting electromagnetic waves so as to cover the entirety of the predetermined space and detecting the reflected waves of the electromagnetic waves; capturing two images of the object candidate from different viewpoints and obtaining predetermined image information from the two captured images; calculating a comparison model, which is an image in which the object model is converted to a size corresponding to the distance of the object candidate; extracting as a comparison image an image in the size range of the comparison model from the images comprising the predetermined image information; and calculating the similarity between the comparison model and comparison image for all of the comparison models calculated from the object candidate and all of the comparison images extracted from the comparison model, determining the maximum similarity, which is a maximum degree of the similarity, the comparison model at the time of maximum similarity calculation, and the coordinates of the comparison image at the time of maximum similarity calculation, and when the maximum similarity is within a predetermined range, acknowledging the selected object candidate as the object, calculating the three-dimensional position of the object from the coordinates of the comparison image at the time of maximum similarity calculation and the distance to the object candidate, and outputting the three-dimensional position of the object candidate to the outside.

The present invention is also an object detection program stored on a computer-readable medium, for causing a computer to execute an object detection method for detecting a detection subject existing in a predetermined space. This program is characterized in comprising: recording a model form of at least one detection subject to be detected as an object model; detecting at least one object candidate and calculating the distance to the object candidate by emitting electromagnetic waves in a radial form so as to cover the entirety of the predetermined space and detecting the reflected waves of the electromagnetic waves; capturing two images of the object candidate from different viewpoints and obtaining predetermined image information from the two captured images; and determining whether or not the object candidate is the detection subject on the basis of the object model and the image information.

The object detection program of the present invention is characterized in further comprising calculating a comparison model, which is an image in which the size of the object model is converted to a size corresponding to the calculated distance to the object candidate, and in that the determination of the determination step as to whether or not the object candidate is the detection subject is made on the basis of the comparison model converted by the model conversion unit, and the image information.

The object detection program of the present invention is also characterized in comprising extracting as a comparison image an image in the size range of the comparison model from the images comprising the predetermined image information, and in that the determination of the determination step as to whether or not the object candidate is the detection subject is made on the basis of the comparison image extracted in the comparison image extraction step and the comparison model.

The object detection program of the present invention is also characterized in that when a plurality of object candidates is detected in the distance calculation step, comparison models for all of the plurality of object models corresponding to the object candidates are calculated in the model conversion step, whereby, in the determination step, the similarity is calculated on the basis of the comparison model for each object candidate and the image information, and the comparison model having the maximum similarity of all the object candidates is determined to be the detection subject.

The object detection program of the present invention is also characterized in that the maximum similarity is compared to a predetermined threshold in the determination step in order to determine whether or not the object candidate is the detection subject corresponding to the comparison model.

The object detection program of the present invention is also characterized in comprising, when the object candidate is determined to be the detection subject in the determination step, calculating the three-dimensional position of the object candidate on the basis of the image information and the distance to the object candidate, assuming that the object candidate is the detection subject.

The object detection program of the present invention is also characterized in comprising extracting as a comparison image an image in the size range of the comparison model from the images comprising the predetermined image information. When the comparison image is extracted from the distance image and at least one of the characteristic images showing the characteristic form, these images serving as the predetermined image information, the determination step comprises calculating a distance image similarity, which is a value obtained by totaling the difference between the value of each pixel of the comparison image extracted from the distance image and the distance of the object, candidate for all pixels, calculating a characteristic image similarity, which is a value obtained by totaling the degree to which the values of each pixel of the comparison image extracted from the characteristic image match the values of the corresponding pixels of the comparison model for all pixels, and calculating the similarity by adding together the distance image similarity, following predetermined weighting thereof, and at least one of the characteristic image similarities, following predetermined weighting thereof.

The object detection program of the present invention is also characterized in comprising further calculating, in the distance calculation step, the relative velocity of the object candidate from the reflected waves exceeding a predetermined threshold in intensity, and in that the determination step comprises outputting the relative velocity of the object candidate outside together with the three-dimensional position of the object.

The object detection program of the present invention is characterized in further comprising storing at least one set of the three-dimensional position and relative velocity of the object, and predicting the three-dimensional position of the object during the next detection using past three-dimensional positions and relative velocities of the object.

The present invention is also an object detection program stored on a computer-readable medium, for causing a computer to execute an object detection method for detecting at least one detection subject existing in a predetermined space. The program is characterized in comprising: calculating and recording an object model, which is an image expressing the form of the at least one detection subject, from a model captured image, which is an image of the detection subject captured in advance at a predetermined distance; detecting at least one object candidate and calculating the distance to the object candidate by emitting electromagnetic waves so as to cover the entirety of the predetermined space and detecting the reflected waves of the electromagnetic waves; capturing two images of the object candidate from different viewpoints and obtaining predetermined image information from the two captured images; calculating a comparison model, which is an image in which the object model is converted to a size corresponding to the distance of the object candidate; extracting as a comparison image an image in the size range of the comparison model from the images comprising the predetermined image information; and calculating the similarity between the comparison model and comparison image for all of the comparison models calculated from the object candidate and all of the comparison images extracted from the comparison model, determining the maximum similarity, which is a maximum degree of the similarity, the comparison model at the time of maximum similarity calculation, and the coordinates of the comparison image at the time of maximum similarity calculation, and when the maximum similarity is within a predetermined range, acknowledging the selected object candidate as an object, calculating the three-dimensional position of the object from the coordinates of the comparison image at the time of maximum similarity calculation and the distance to the object candidate, and outputting the three-dimensional position of the object candidate to the outside.

Note that in the object detection program described above, the computer-readable medium includes the semiconductor memory of a ROM or RAM, a portable storage medium such as a CD-ROM, flexible disk, DVD disk, magneto-optical disk, or IC card, a database supporting a computer program, another computer and its database, and a transmission medium on a line.

The present invention is also a distance sensor for detecting a distance to at least one object existing in an observation subject space, characterized in comprising: a transmission unit that generates a transmission signal; an antenna that is capable of emitting the transmission signal as electromagnetic waves which cover the entirety of the observation subject space at one time, and of receiving electromagnetic waves from the entirety of the observation subject space; a reception unit that demodulates the output of the antenna; a reflected wave detection unit that detects reflected waves from the output of the reception unit; and an object candidate calculation unit that calculates a distance using the timing of the reflected waves, and outputs the distance outside as the distance to the object candidate.

According to this constitution, bearing resolution is not needed, unlike in a conventional radar, and hence the antenna can be reduced in size.

The distance sensor of the present invention is also characterized in that the electromagnetic waves are millimeter waves.

According to this constitution, the distance to an object can be measured with good precision, and the millimeter waves are not likely to be affected by the peripheral environment, such as rain and fog.

The distance sensor of the present invention is also characterized in that the object candidate calculation unit further calculates a relative velocity using the frequency of the reflected waves, and outputs this relative velocity outside together with the distance of the object candidate.

According to this constitution, the future position of the object candidate can be predicted using the relative velocity.

BRIEF DESCRIPTION OF THE DRAWINGS

FIG. 5 is a view showing an example of object candidate data outputted from the millimeter wave distance sensor of the present invention;

FIG. 6 is a block diagram showing an example of the constitution of a stereo image sensor;

FIG. 7 is a view showing an example of a captured image I1 and a distance image corresponding to the captured image I1;

FIG. 11 is a view showing an example of an equation for calculating a similarity C;

FIG. 12 is a view showing an example of an equation for calculating a three-dimensional position;

BEST MODE FOR CARRYING OUT THE INVENTION

Embodiments of the present invention will be described in detail below with reference to the drawings.

First Embodiment

This embodiment will be described using an example in which an object detection apparatus of the present invention detects a vehicle.

Figure 1A:
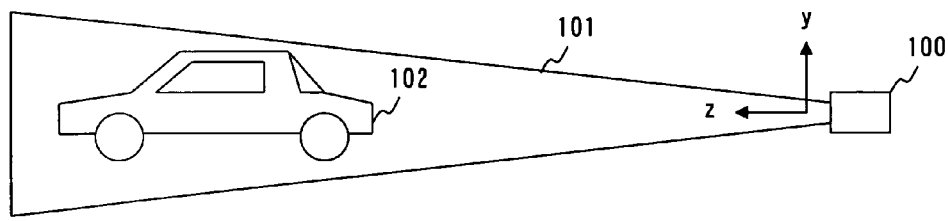
FIG. 1 is a view showing an example of the disposition of an object detection apparatus of the present invention and a vehicle serving as a detection subject.
Figure 1B:
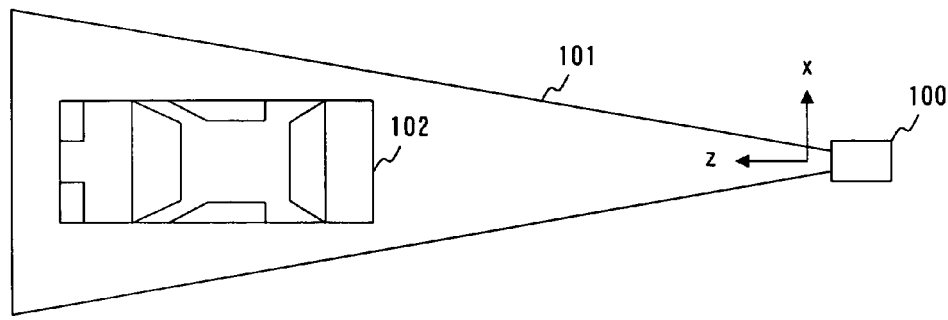

FIG. 1 is a view showing an example of the disposition of the object detection apparatus of the present invention and a vehicle serving as a detection subject. FIG. 1A is a side view, and FIG. 1B is a top view. In this embodiment, an object detection apparatus 100 detects a vehicle 102 which exists within an observation subject space 101. Here, for simplicity, a single vehicle 102 is illustrated, but in actuality, a plurality of vehicles may exist within the observation subject space 101. Further, for the purpose of description, the x axis, y axis, and z axis are defined as shown in FIG. 1.

Figure 2:
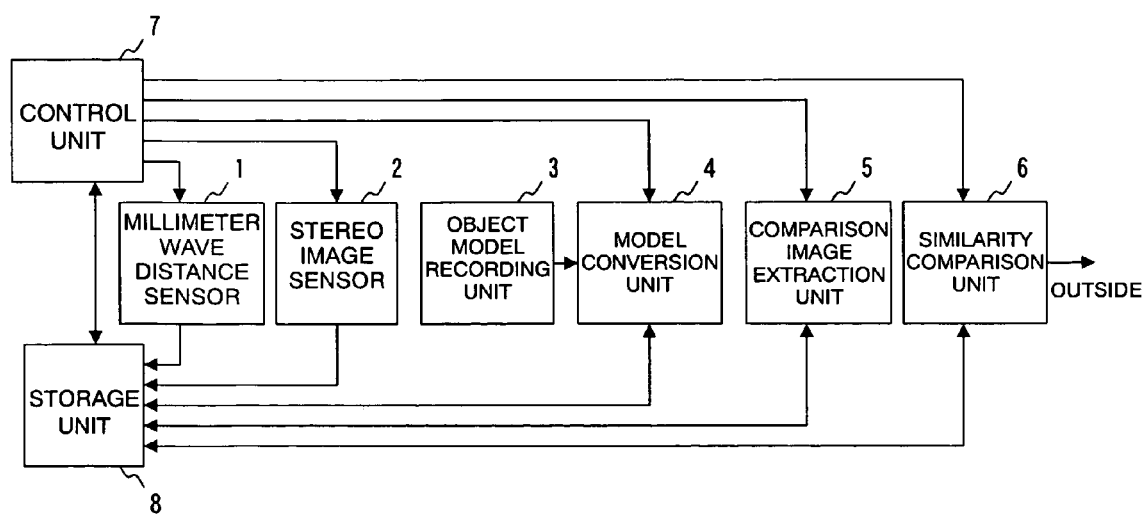
FIG. 2 is a block diagram showing an example of the constitution of an object detection apparatus according to a first embodiment.

Next, the constitution of the object detection apparatus of the present invention will be described. FIG. 2 is a block diagram showing an example of the constitution of the object detection apparatus according to the first embodiment. The object detection apparatus of the present invention is constituted by a millimeter wave distance sensor 1, a stereo image sensor 2, an object model recording unit 3, a model conversion unit 4, a comparison image extraction unit 5, a similarity comparison unit 6, a control unit 7, and a storage unit 8. Here, the comparison image extraction unit 5, similarity comparison unit 6, control unit 7, and storage unit 8 constitute a determination unit of the present invention.

Figure 3:
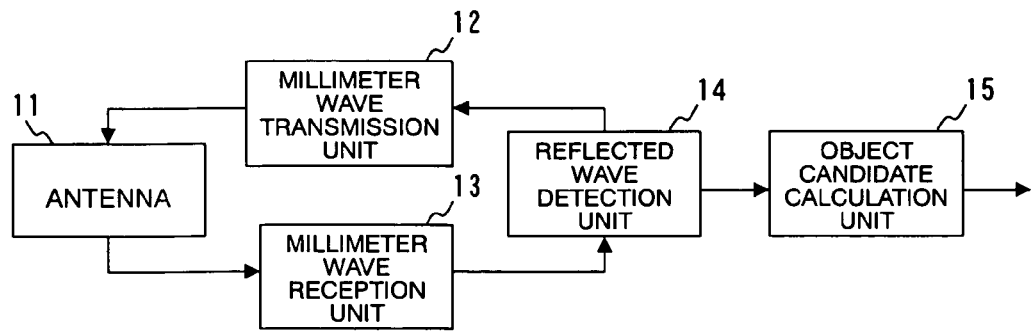
FIG. 3 is a block diagram showing an example of the constitution of a millimeter wave distance sensor of the present invention.
Figure 4A:
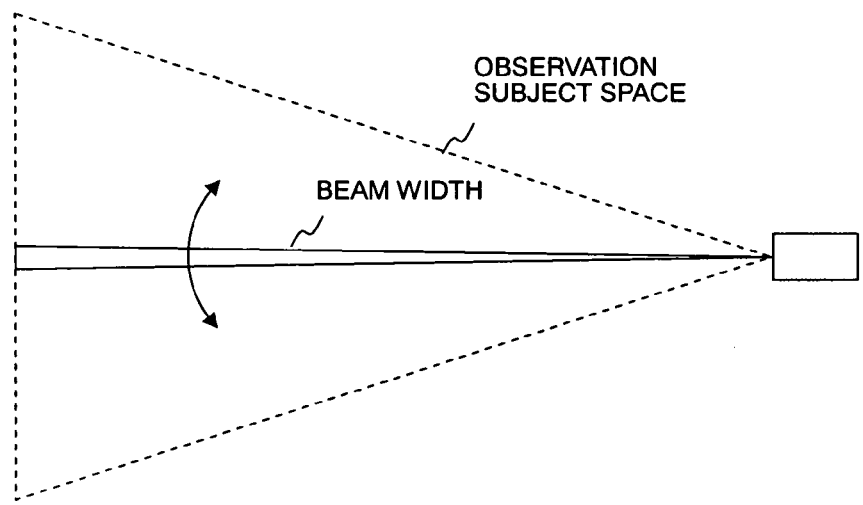
FIG. 4 is a view showing an example of a beam emitted by a conventional millimeter wave radar and a beam emitted by the millimeter wave distance sensor of the present invention.
Figure 4B:
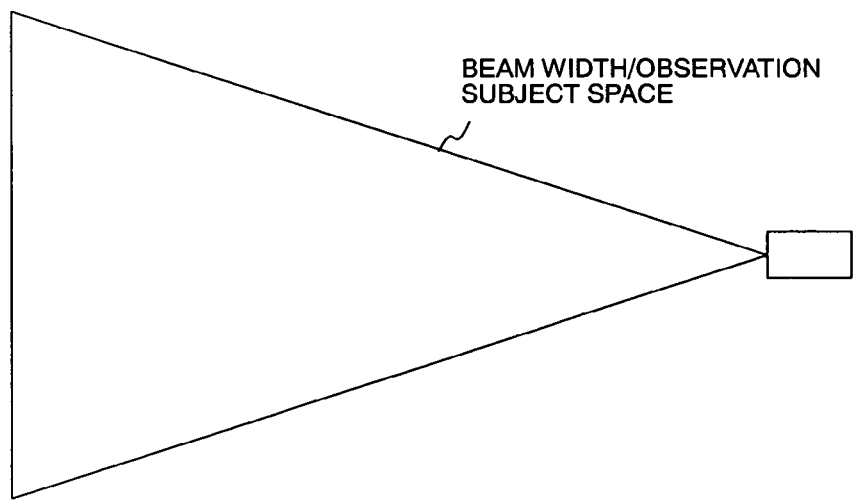

Next, the constitution of the millimeter wave distance sensor 1 will be described. FIG. 3 is a block diagram showing an example of the constitution of the millimeter wave distance sensor of the present invention. The millimeter wave distance sensor 1 is constituted by an antenna 11, a millimeter wave transmission unit 12, a millimeter wave reception unit 13, a reflected wave detection unit 14, and an object candidate calculation unit 15. The millimeter wave distance sensor 1 of the present invention differs from a conventional millimeter wave radar in that only the distance to the object and the relative velocity of the object are detected, and hence the beam width of the emitted millimeter waves can be increased by an angle of approximately twenty to thirty degrees, enabling the size of the antenna to be reduced greatly. More specifically, a conventional antenna has a size of approximately 150 mm×150 mm, whereas the antenna of the present invention can be reduced to a size of approximately 30 mm×30 mm. FIG. 4 is a view showing an example of the width of the beams emitted from a conventional millimeter wave radar and the millimeter wave distance sensor of the present invention. FIG. 4A shows the beam width of a conventional millimeter wave radar in relation to the observation subject space, and FIG. 4B shows the beam width of the millimeter wave distance sensor used in the present invention in relation to the observation subject space.

Further, by increasing the beam width, the millimeter wave distance sensor used in the present invention emits a millimeter wave beam which covers the entire observation subject space at the same time. Hence a mechanism for varying the direction in which the beam is emitted, which is required in a conventional millimeter wave radar in order to widen the observation subject space, is not needed, enabling a further reduction in size.

Next, an operation of the millimeter wave distance sensor 1 will be described. The reflected wave detection unit 14 outputs an instruction to transmit a millimeter wave to the millimeter wave transmission unit 12. In accordance with the instruction from the reflected wave detection unit 14, the millimeter wave transmission unit 12 generates a transmission signal comprising a modulated millimeter wave, and transmits the transmission signal via the antenna 11. The millimeter wave reception unit 13 receives the millimeter wave, which is a reflected wave, through the antenna 11, demodulates the millimeter wave, and outputs the millimeter wave to the reflected wave detection unit 14. The reflected wave detection unit 14 detects the reflected wave from the demodulated signal, and outputs the delay time of each reflected wave exceeding a predetermined threshold TM0 in intensity to the object candidate calculation unit 15. The object candidate calculation unit 15 detects the distance to the object candidate and the relative velocity of the object candidate from the detected reflected wave, and outputs this information to the storage unit 8 as object candidate data. FIG. 5 is a view showing an example of the object candidate data outputted from the millimeter wave distance sensor. As shown in FIG. 5, the object candidate data comprise an object candidate number i, a distance to the object candidate di, and a relative velocity of the object candidate vi. Here, the number of detected object candidates is n. The object candidate data are stored in the storage unit 8.

Next, the constitution of the stereo image sensor 2 will be described. FIG. 6 is a block diagram showing an example of the constitution of the stereo image sensor. The stereo image sensor is constituted by a camera A 21, a camera B 22, a characteristic image calculation unit 23, and a distance image calculation unit 24.

Next, an operation of the stereo image sensor 2 will be described. The two cameras A 21 and B 22 capture images of the observation subject space from different viewpoints. Here, a captured image captured by the camera A 21 is set as I1 (s,t), and a captured image captured by the camera B 22 is set as I2 (u,v). Here, s, u express the x coordinate of a pixel, and t, v express the y coordinate of a pixel.

Next, the characteristic image calculation unit 23 calculates from the captured image I1 and captured image I2 a characteristic image (a characteristic image relating to form) constituted by the contour, form, grayscale pattern, and so on, and outputs this characteristic image to the storage unit 8. In this embodiment, an edge image E1 (s,t) obtained from the captured image I1 by performing edge detection using a predetermined threshold TI0, and an edge image E2 (u,v) obtained from the captured image I2 by performing edge detection using the predetermined threshold TI0, are calculated as characteristic images. The captured images I1, I2 and characteristic images E1, E2 are stored in the storage unit 8.

Next, the distance image calculation unit 24 calculates a distance image D (p,q) from the two captured images I1, I2, and outputs this distance image D to the storage unit 8. In this embodiment, the distance image is obtained by associating each pixel of I2 with each pixel of I1, calculating the distance to each pixel of I1 on the basis of a triangulation principle, and expressing the calculated distances as a two-dimensional array corresponding to the coordinates of I1. For example, FIG. 7B shows a distance image corresponding to the coordinates of the captured image I1 shown in FIG. 7A. The numerals in FIG. 7B show the distance at each coordinate. The distance image D is stored in the storage unit 8.

Figure 8A:
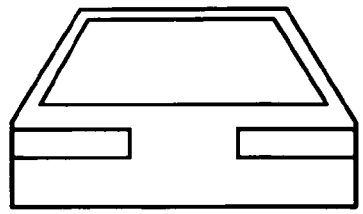
FIG. 8 is a view showing an example of a relationship between an object model Mj and a comparison model Mj'.

Next, the object model recording unit 3 will be described. The object model recording unit 3 records the size of the vehicle to be detected and a characteristic image thereof in advance as an object model. In this embodiment, an image of a vehicle having the same form as the detection subject existing at a distance L within the observation subject space is captured in advance by the camera A 21, and an edge image calculated from this captured image is recorded as an object model. Here, an object model of the model number j is expressed as Mj. FIG. 8A shows an example of the object model Mj. When all of the detection subjects can be classified into m types, all of the detection subjects are expressed by recording m object models.

Figure 9:
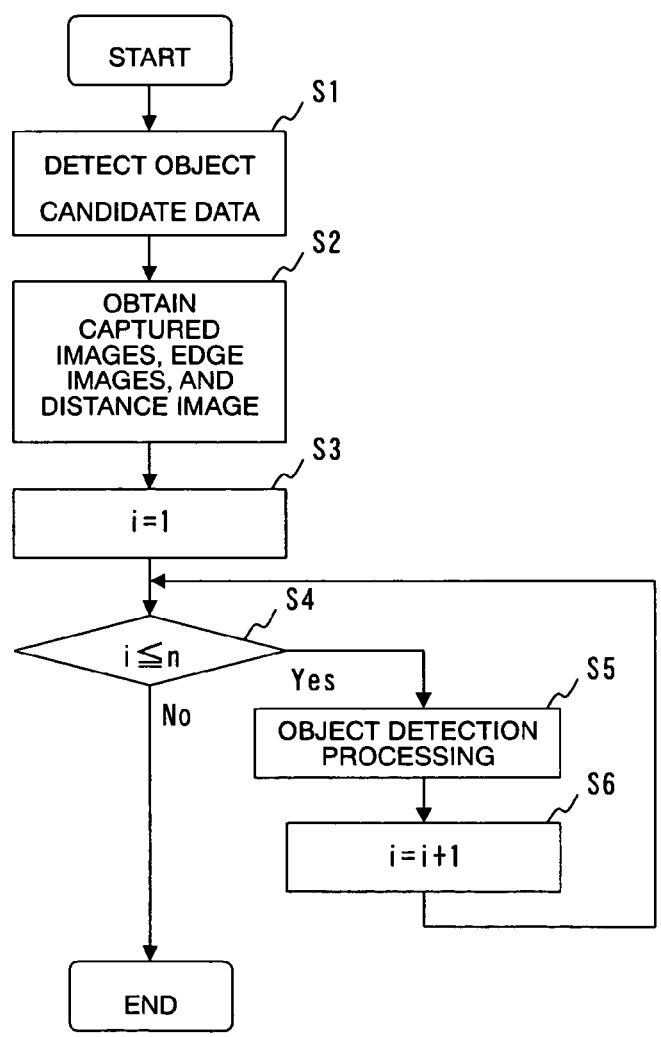
FIG. 9 is a flowchart showing an example of an operation of the object detection apparatus according to the first embodiment.

Next, an operation of the object detection apparatus will be described in outline. FIG. 9 is a flowchart showing an example of an operation of the object detection apparatus according to the first embodiment. The observation subject spaces of the millimeter wave distance sensor 1 and the stereo image sensor 2 are preset such that the observation subject space of the stereo image sensor 2 encompasses the observation subject space of the millimeter wave distance sensor.

First, the control unit 7 issues an instruction to the millimeter wave distance sensor 1, whereby the millimeter wave distance sensor 1 retrieves object candidate data (S1). Synchronously, the control unit 7 issues an instruction to the stereo image sensor 2, whereby the stereo image sensor 2 retrieves the captured images I1, I2, the edge images E1, E2, and the distance image D (S2).

Next, the control unit 7 initializes the object candidate number i such that i=1 (S3). Next, the control unit 7 determines whether or not there are any object candidates on which the object detection processing to be described below has not yet been performed, or in other words whether or not i≦n (S4). If i≦n (S4, Yes), the control unit 7 selects the object candidate i, which is the object candidate having the object candidate number i, from among the n object candidates, subjects the object candidate i to the object detection processing to be described below (S5), increases i (S6), and then returns to the process S4. On the other hand, if i≦n is not satisfied (S4, No), the control unit 7 determines that object detection processing has been performed on all of the object candidates, and terminates the flow.

Figure 10:
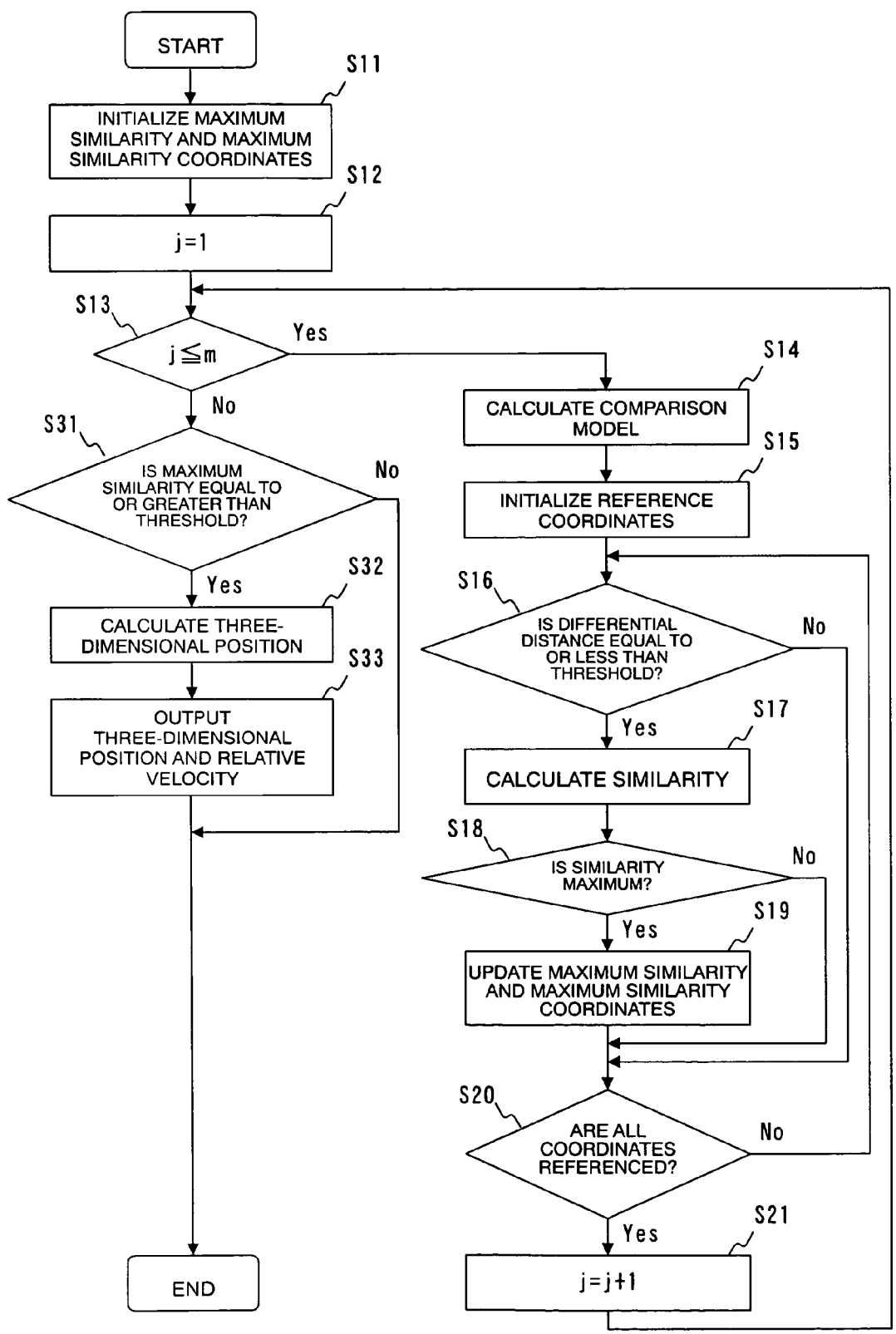
FIG. 10 is a flowchart showing an example of an object detection processing operation.

Next, the object detection processing operation of the process S5 will be described in detail. FIG. 10 is a flowchart showing an example of the object detection processing operation.

First, the control unit 7 initializes a maximum similarity Cmax, and maximum similarity coordinates (pmax, qmax), which are the coordinates having the value of the maximum similarity Cmax (S11). The maximum similarity Cmax will be described hereafter. Next, the control unit 7 initializes the model number j such that j=1 (S12).

Next, the control unit 7 determines whether or not there are any object models that have not yet undergone the processing of S14 to S20, to be described below, or in other words whether or not j≦m (S13). If j≦m (S13, Yes), the control unit 7 selects the object model Mj of the model number j from among the m object models recorded in the object model recording unit 3, and issues an instruction to the model conversion unit 4. In accordance with the instruction, the model conversion unit 4 retrieves the object model Mj from the object model recording unit 3, and retrieves the distance di from the storage unit 8. Next, the model conversion unit 4 creates a comparison model Mj' from the object model Mj, calculates a length lx of Mj' in the x axis direction and a length ly of Mj' in the y axis direction, and outputs this information to the storage unit 8 (S14).

Figure 8B:
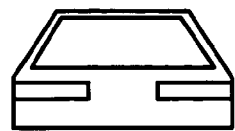

Here, the comparison model Mj' will be described. Assuming that the object candidate i exists at the distance di, the model conversion unit 4 creates the comparison model Mj' shown in FIG. 8B by estimating the size that the object model Mj, which expresses the size of an object existing at a distance L on a characteristic image, would take on a characteristic image if the object model Mj existed at the distance di. The model conversion unit 4 achieves this by modifying the size of the object model Mj shown in FIG. 8A by di/L.

Next, the control unit 7 initializes reference coordinates (p,q), which are coordinates for referencing the values of the distance image D (S15).

Next, the control unit 7 issues an instruction to the comparison image extraction unit 5, whereby the comparison image extraction unit 5 retrieves the distance di and the distance image D from the storage unit 8. The comparison image extraction unit 5 searches for reference coordinates which satisfy the condition that the differential distance between the distance D (p,q) in the reference coordinates (p,q) of the distance image D and the distance di is no greater than a predetermined threshold Td, and sets a coordinate range of an identical size to the comparison model around the reference coordinates which satisfy the condition as a comparison range. Here, the comparison image extraction unit 5 determines whether or not the differential distance between the distance D (p,q) and the distance di is no greater than the threshold Td, or in other words whether or not (di-D (p,q))≦Td (S16). If (di-D (p,q)) s Td is not satisfied (S16, No), the routine advances to a process S20. On the other hand, if (di-D(p,q))≦Td (S16, Yes), the reference coordinates at this time are set as (p0,q0), a coordinate range of p0-lx<p<p0, q0-ly<q<q0 is set as the comparison range, and this comparison range is output to the storage unit 8.

Next, the control unit 7 issues an instruction to the similarity comparison unit 6, whereby the similarity comparison unit 6 retrieves from the storage unit 8 comparison images, which are images showing the comparison range parts of the distance image D and edge images E1, E2 respectively, the comparison model Mj', and the distance di. Next, the similarity comparison unit 6 scans each comparison image and the corresponding pixels of the comparison model Mj'. Here, the coordinates of the pixels undergoing scanning are set as scanned coordinates. A similarity C is calculated from the values of the scanned coordinates of the distance image D and edge images E1, E2, the values of the scanned coordinates of the comparison model Mj', and the distance di, using the equations shown in FIG. 11 (S17). The similarity C is a value expressing the degree of similarity between the object candidate i and the comparison model Mj. In the equations in FIG.

11, the symbols w1, w2, w3 are predetermined weighting coefficients. Further, the symbols dx, dy are a parallax determined from the distance di to the positions of the camera A 21 and the camera B 22. Note that here, the similarity C is calculated using the distance image D and the edge images E1, E2, but may be calculated using the distance D and at least one of the edge images E1, E2.

Next, the similarity comparison unit 6 determines whether or not the similarity C at the current reference coordinates is at a maximum, or in other words whether or not C>Cmax (S18). If C>Cmax is not satisfied (S18, No), the routine advances to the process S20. On the other hand, if C>Cmax (S18, Yes), the value of the maximum similarity Cmax is updated to the value of the similarity C at the current reference coordinates, and the maximum similarity coordinates (pmax, qmax) are updated to the current reference coordinates (p,q) (S19).

Next, the similarity comparison unit 6 determines whether or not all of the coordinates of the distance image have been referenced as reference coordinates (S20). If not all of the coordinates have been referenced (S20, No), the routine returns to the process S16. If all of the coordinates have been referenced (S20, Yes), j is increased by 1 (S21), and the routine returns to the process S13.

By performing object detection processing in which all of the object models Mj are compared to the object candidate i and the maximum similarity Cmax and maximum similarity coordinates (pmax, qmax) are calculated, as described above, the maximum similarity Cmax and maximum similarity coordinates (pmax, qmax) of the object candidate i can be obtained.

If j≦m is not satisfied in the process S13 (S13, No), the similarity comparison unit 6 determines whether or not the maximum similarity Cmax is equal to or greater than a predetermined threshold Tc (S31). If the maximum similarity is equal to or greater than the threshold, or in other words if Cmax≧Tc (S31, Yes), the object candidate i is determined to exist at the point of the maximum similarity coordinates (pmax, qmax), and the three-dimensional position (Xi, Yi, Zi) thereof is calculated using the equations shown in FIG. 12 (S32). In the equations in FIG. 12, the symbol f denotes the focal length of the camera A, the symbol kx denotes a conversion coefficient for converting units in the x axis direction into actual lengths from the pixels, and ky is a conversion coefficient for converting units in the y axis direction into actual lengths from the pixels. Next, the similarity comparison unit 6 sets the values calculated in the process S32 as the three-dimensional position of the object candidate i, outputs the three-dimensional position (Xi, Yi, Zi) and the relative velocity vi of the object candidate i to the storage unit 8 and outside (S33), and then terminates the flow.

On the other hand, if Cmax≧Tc is not satisfied (S31, No), the similarity comparison unit 6 terminates the flow without outputting the three-dimensional position and relative velocity.

By performing this object detection processing for all of the object candidates, an object detection apparatus which satisfies the requirements of a large observation subject space, accurate detection of only the object to be detected, and accurate detection of the three-dimensional position of the object can be realized.

By storing the processing of FIG. 9 and the processing of FIG. 10 on a computer-readable recording medium as an object detection program, an object detection method can be executed on a computer. Note that in the present invention, this computer-readable recording medium may be the semiconductor memory of a ROM or RAM, a portable recording medium such as a CD-ROM, flexible disk, DVD disk, magneto-optical disk, or IC card, a database supporting a computer program, another computer and its database, or a transmission medium on a line.

Second Embodiment

In this embodiment, stable image detection is performed by predicting the three-dimensional position on the basis of previous three-dimensional positions and relative velocities when a similar object detection operation to that of the first embodiment is performed continuously at brief time intervals.

Figures 13, 14:
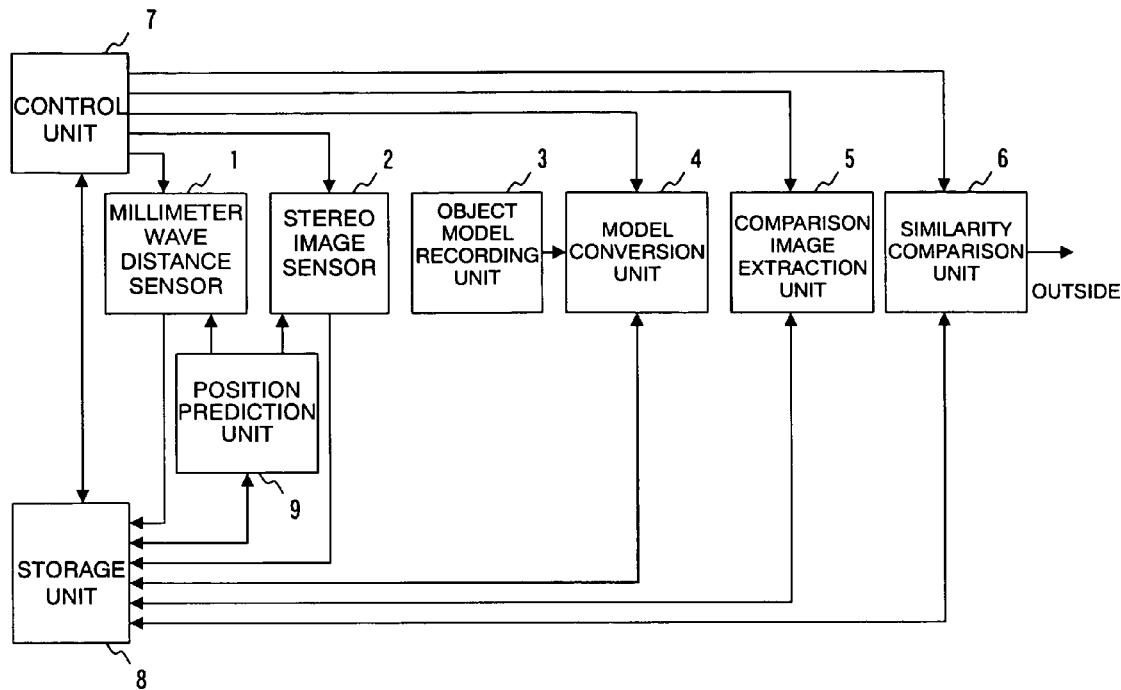
FIG. 13 is a block diagram showing an example of the constitution of an object detection apparatus according to a second embodiment.
FIG. 14 is a view showing an example of an equation for calculating the three-dimensional position of an object candidate i at a time t+1.

FIG. 13 is a block diagram showing an example of the constitution of an object detection apparatus according to a second embodiment. In this embodiment, a position prediction unit 9 is added to the constitution of the first embodiment.

The object detection apparatus performs object detection continuously, and the three-dimensional position and relative velocity of each object detected by one detection are stored in the storage unit 8. Before performing the next detection, the position prediction unit 9 retrieves the three-dimensional position and relative velocity of each object detected previously from the storage unit 8. Next, the position prediction unit 9 uses the three-dimensional position and relative velocity of each previously-detected object to predict the three-dimensional position in the next detection, and transmits the result of the prediction to the millimeter wave distance sensor 1 and stereo image sensor 2.

Here, the output of the similarity comparison unit 6 at a time t comprises the three-dimensional position (Xi (t), Yi (t), Zi (t)) and relative velocity vi (t) of the object candidate i, and hence the three-dimensional position of the object candidate i at a time t+1 can be predicted using these values together with the equations shown in FIG. 14.

In the process S1 of FIG. 9, the reflected wave detection unit 14 of the millimeter wave distance sensor 1 detects object candidate data using the prediction result. In the process S2 of FIG. 9, the characteristic image calculation unit 23 of the stereo image sensor 2 detects edge images using the prediction result.

Figure 15:
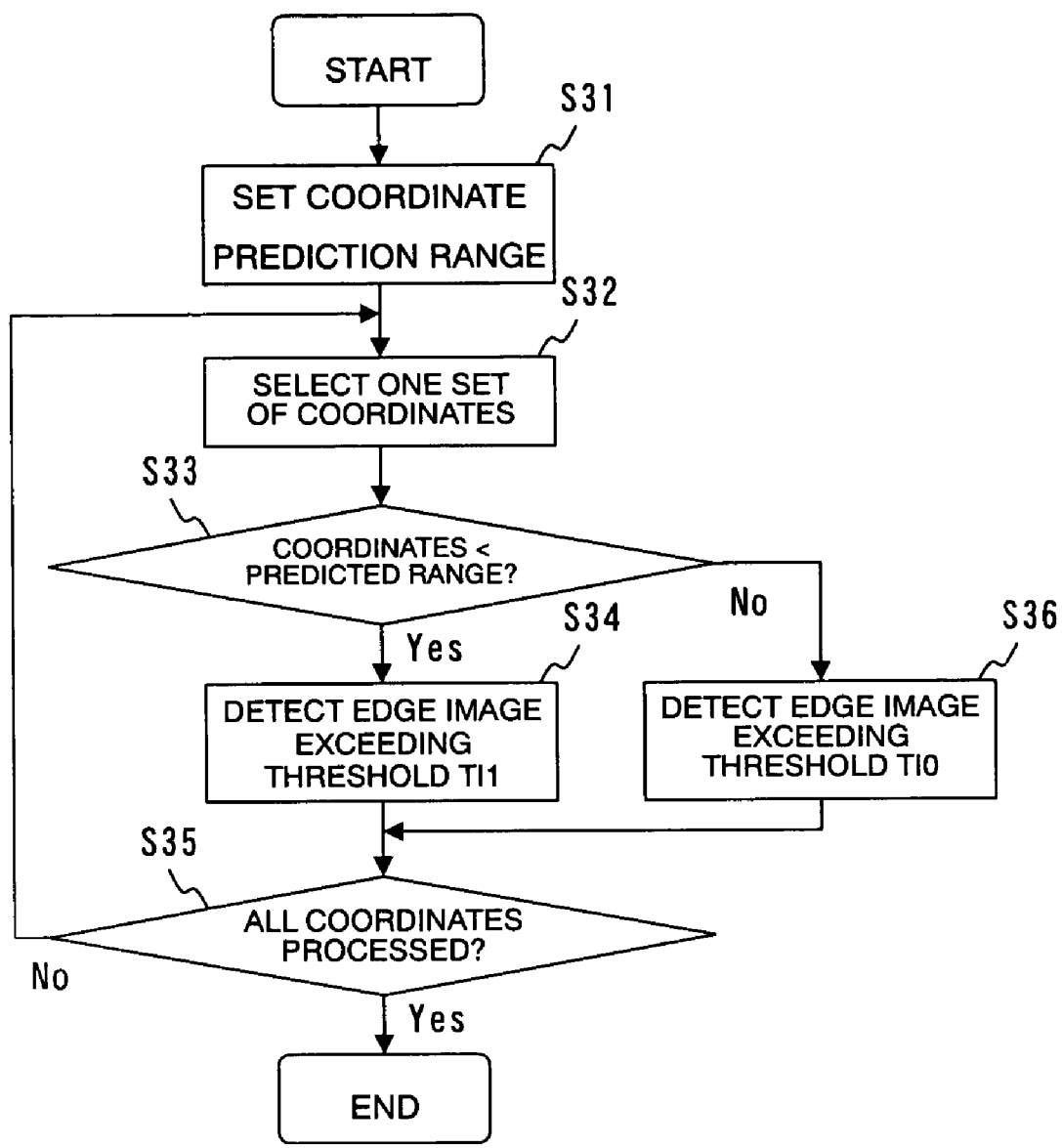
FIG. 15 is a flowchart showing an example of an operation of a characteristic image calculation unit according to the second embodiment.

Next, an operation of the characteristic image calculation unit 23 in the stereo image sensor 2 will be described in detail. FIG. 15 is a flowchart showing an operation of the characteristic image calculation unit 23 according to the second embodiment. First, a region of the characteristic image in which the object can be observed is set as a prediction range from the three-dimensional position of the object, predicted by the position prediction unit 9 (S31). Next, one set of coordinates is selected (S32), and a determination is made as to whether or not the coordinates exist within the prediction range (S33). If the coordinates do not exist within the prediction range (S33, No), the edge images are detected using the normal threshold Tl0 (S34), and the routine advances to a process S35. If the coordinates exist within the prediction range (S33, Yes), the edge images are detected using a smaller threshold Tl1 than the normal threshold Tl0 (S36), whereupon the routine advances to the process S35. If processing is not complete for all coordinates (S35, No), the routine returns to the process S32. When all coordinates have been processed (S35, Yes), the flow is terminated.

Figure 16:
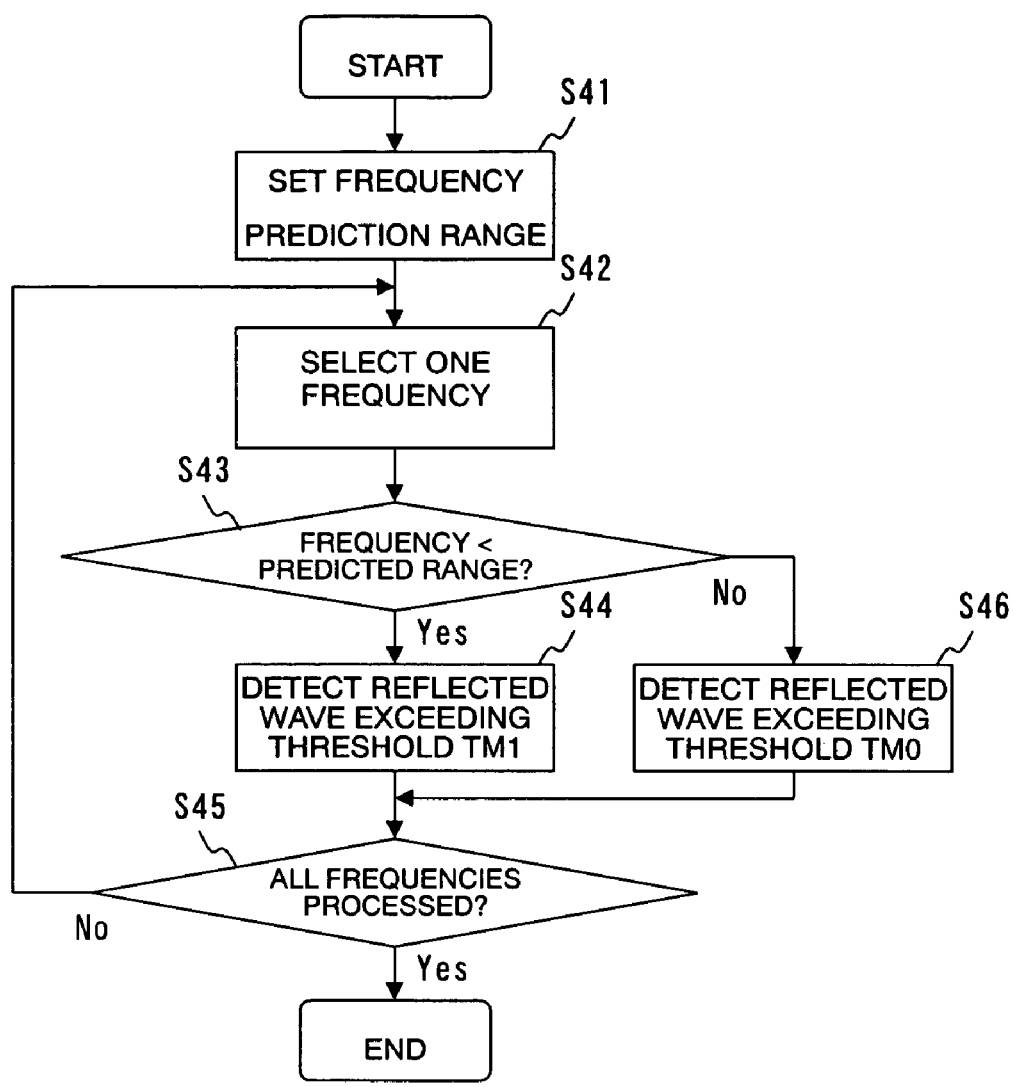
FIG. 16 is a flowchart showing an example of an operation of a reflected wave detection unit according to the second embodiment.

Next, an operation of the reflected wave detection unit 14 in the millimeter wave distance sensor 1 will be described in detail. Here, a case in which the intensity of the reflected waves is distributed according to frequency, and the distance from the position on the frequency axis is detected, as in an FM-CW (frequency modulation-continuous wave) system, will be described. FIG. 16 is a flowchart showing an operation of the reflected wave detection unit according to the second embodiment. First, the frequency at which a reflected wave from the object can be observed is set as the prediction range from the three-dimensional position of the object predicted by the position prediction unit 9 during the previous measurement (S41). Next, a single frequency is selected (S42), and a determination is made as to whether or not the frequency exists within the prediction range (S43). If the frequency does not exist within the prediction range (S43, No), the reflected wave is detected using the normal threshold TM0 (S44), and the routine advances to a process S45. If the frequency exists within the prediction range (S43, Yes), the reflected wave is detected using a smaller threshold TM1 than the normal threshold TM0 (S46), whereupon the routine advances to the process S45. If processing is not complete for all frequencies (S45, No), the routine returns to the process S42. When all frequencies have been processed (S45, Yes), the flow is terminated. Thus, when detecting distance from the position on the frequency axis in the manner described above, by using a smaller threshold TM1 than the normal threshold TM0 within the prediction range, a window which enables the predicted reflected waves to be detected more easily can be provided on the frequency axis.

In this embodiment, a case in which measurement is performed on a frequency axis was described, but the intensity of the reflected waves may be distributed according to time difference such that the distance is detected from the position on a temporal axis. In such a case, by setting a time difference prediction range and using a smaller threshold TM1 than the normal threshold TM0 within the prediction range, a window which enables the predicted reflected waves to be detected more easily can be provided on the temporal axis. Furthermore, in this embodiment the three-dimensional position of the next detection is predicted, but by storing a plurality of past three-dimensional distances and relative velocities in the storage unit 8, the relative velocity of the next detection may be predicted. By using the predicted relative velocity, the window enabling the predicted reflected waves to be detected more easily can be positioned accurately.

In the embodiment described above, continuous object detection can be performed with stability using a predicted three-dimensional position.

Note that in the embodiment described above, the model conversion unit converts the size of the object model to a size corresponding to the distance of the object candidate, but the present invention is not limited to this embodiment, and the captured images of the object candidate (the distance image and characteristic image) may be converted to the same size as the object model in accordance with the distance of the object candidate, for example. Moreover, in this embodiment a determination is made as to whether or not the object candidate is the detection subject using a distance image and a characteristic image, but this determination may be made using either one of these images alone.

INDUSTRIAL APPLICABILITY

According to the present invention as described above, the advantages of a millimeter wave distance sensor, such as highly accurate detection of the distance to an object and a low likelihood of being affected by the peripheral environment, such as rain or fog, and the advantages of a stereo image sensor, such as a wide observation subject space, accurate detection of the object bearing, and simple object identification, can be achieved simultaneously. Further, the apparatus can be reduced in size, enabling easy installation in a vehicle or the like. Moreover, the three-dimensional position of the next detection can be predicted, enabling stable continuous detection of an object.

The invention claimed is:

1. An object detection apparatus for detecting a detection subject existing in a predetermined space, comprising:
   an object model recording unit that records an object model, the object model being an image expressing a form of at least one detection subject to be detected;
   a distance sensor that detects at least one object candidate and calculates the distance to said object candidate by emitting electromagnetic waves in a radial form so as to cover the entirety of said predetermined space and detecting reflected waves of said electromagnetic waves;
   a stereo image sensor that captures two images of said object candidate from different viewpoints and obtains image information from said two captured images;
   a model conversion unit that calculates a comparison model, which is an image in which the size of said object model is converted to a size corresponding to said calculated distance to said object candidate; and
   a determination unit that extracts a comparison image from said image information and determines a similarity between said comparison model and said comparison image,
   wherein said determination unit determines whether or not said object candidate is said detection subject on the basis of said similarity between said comparison model and said comparison image.

2. The object detection apparatus as set forth in claim 1, wherein said image information obtained by said stereo image sensor is information of a distance image relating to the distance of said object candidate.

3. The object detection apparatus as set forth in claim 1, wherein said image information obtained by said stereo image sensor is information of a characteristic image relating to the form of said object candidate.

4. The object detection apparatus as set forth in claim 1, wherein said image information obtained by said stereo image sensor is information of a distance image relating to the distance of said object candidate and information of a characteristic image relating to the form of said object candidate.

5. The object detection apparatus as set forth in claim 1, wherein said object model recorded in said object model recording unit takes a form obtained by capturing an image of said detection subject at a predetermined distance.

6. The object detection apparatus as set forth in claim 1, further comprising:
   a position calculation unit which, when said object candidate is determined to be said detection subject by said determination unit, calculates a three-dimensional position of said object candidate on the basis of said image information and the distance to said object candidate, assuming that said object candidate is said detection subject.

7. The object detection apparatus as set forth in claim 1, wherein said distance sensor calculates the distance to said object candidate from said reflected waves exceeding a predetermined threshold in intensity.

8. The object detection apparatus as set forth in claim 1, wherein said electromagnetic waves are millimeter waves.

9. An object detection method for detecting a detection subject existing in a predetermined space, comprising:
   recording a model form of at least one detection subject to be detected as an object model;

detecting at least one object candidate and calculating the distance to said object candidate by emitting electromagnetic waves in a radial form so as to cover the entirety of said predetermined space and detecting reflected waves of said electromagnetic waves;

capturing two images of said object candidate from different viewpoints and obtaining image information from said two captured images;

calculating a comparison model, which is an image in which the size of said object model is converted to a size corresponding to said calculated distance to said object candidate;

extracting a comparison image from said image information;

determining a similarity between said comparison model and said comparison image; and determining whether or not said object candidate is said detection subject on the basis of said similarity between said comparison model and said comparison image.

10. The object detection method as set forth in claim 9, further comprising, when said object candidate is determined to be said detection subject in the determination step, calculating a three-dimensional position of said object candidate on the basis of said image information and the distance to said object candidate, assuming that said object candidate is said detection subject.

11. An object detection program stored on a computer-readable medium, for causing a computer to execute an object detection method for detecting a detection subject existing in a predetermined space, said program comprising:

recording a model form of at least one detection subject to be detected as an object model;

detecting at least one object candidate and calculating the distance to said object candidate by emitting electromagnetic waves in a radial form so as to cover the entirety of said predetermined space and detecting reflected waves of said electromagnetic waves;

capturing two images of said object candidate from different viewpoints and obtaining image information from said two captured images; and calculating a comparison model, which is an image in which the size of said object model is converted to a size corresponding to said calculated distance to said object candidate;

extracting a comparison image from said image information;

determining a similarity between said comparison model and said comparison image; and determining whether or not said object candidate is said detection subject on the basis of said similarity between said comparison model and said comparison image.

12. The object detection program as set forth in claim 11, further comprising, when said object candidate is determined to be said detection subject in the determination step, calculating a three-dimensional position of said object candidate on the basis of said image information and the distance to said object candidate, assuming that said object candidate is said detection subject.

* * * * *